US011013020B2

(12) United States Patent
Liu et al.

(10) Patent No.: US 11,013,020 B2
(45) Date of Patent: May 18, 2021

(54) CANCELABLE NAN SCHEDULE INDICATION

(71) Applicant: Apple Inc., Cupertino, CA (US)

(72) Inventors: Yong Liu, Campbell, CA (US); Christiaan A. Hartman, San Jose, CA (US); Lawrie Kurian, San Jose, CA (US); Peter N. Heerboth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 15/644,964

(22) Filed: Jul. 10, 2017

(65) Prior Publication Data

US 2018/0035449 A1  Feb. 1, 2018

Related U.S. Application Data

(60) Provisional application No. 62/368,219, filed on Jul. 29, 2016.

(51) Int. Cl.
| | |
|---|---|
| *H04W 72/12* | (2009.01) |
| *H04W 48/12* | (2009.01) |
| *H04L 12/18* | (2006.01) |
| *H04W 48/16* | (2009.01) |
| *H04W 76/10* | (2018.01) |
| *H04W 76/14* | (2018.01) |
| *H04W 84/12* | (2009.01) |
| *H04W 92/18* | (2009.01) |

(52) U.S. Cl.
CPC ....... *H04W 72/1263* (2013.01); *H04L 12/189* (2013.01); *H04W 48/16* (2013.01); *H04W 72/1252* (2013.01); *H04W 76/10* (2018.02); *H04W 76/14* (2018.02); *H04W 72/1278* (2013.01); *H04W 84/12* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 9,386,512 B2 | 7/2016 | Park et al. | |
| 2015/0036572 A1* | 2/2015 | Seok | H04W 52/0216 370/311 |
| 2015/0319235 A1 | 11/2015 | Liu et al. | |
| 2016/0278112 A1 | 9/2016 | Liu et al. | |
| 2016/0286573 A1* | 9/2016 | Abraham | H04L 63/065 |
| 2017/0245296 A1* | 8/2017 | Huang | H04W 74/006 |
| 2018/0027494 A1* | 1/2018 | Huang | H04W 76/10 370/311 |
| 2018/0332631 A1* | 11/2018 | Li | H04W 76/14 |

* cited by examiner

*Primary Examiner* — Kevin C. Harper
*Assistant Examiner* — Derrick V Rose
(74) *Attorney, Agent, or Firm* — Kowert, Hood, Munyon, Rankin & Goetzel, P.C.

(57) ABSTRACT

In embodiments, one or more wireless stations operate to configure direct communication with neighboring mobile stations, i.e., direct communication between the wireless stations without utilizing an intermediate access point. Embodiments of the disclosure relate to NAN datapath scheduling and NAN pre-datapath operation setup and scheduling. The NAN datapath embodiments described herein provide a mechanism through which stations can communicate and provide services. In particular, embodiments described herein relate to the use of cancelable and non-cancelable further availability windows in conjunction with NAN communication.

20 Claims, 9 Drawing Sheets

CANCELABLE NAN SCHEDULE INDICATION

PRIORITY INFORMATION

This application claims priority to U.S. provisional patent application Ser. No. 62/368,219, entitled "Cancelable NAN Schedule Indication," filed Jul. 29, 2016, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems Wi-Fi mobile stations are able to communicate directly with each other without using an intermediate access point. However, improvements in the operation of such devices are desired, such as in setup and coordination of the communication between such devices.

SUMMARY

Embodiments described herein relate to systems, apparatuses, and methods for using cancelable and non-cancelable further availability windows in a neighbor awareness network (NAN) communication system.

Embodiments relate to a wireless station that includes one or more antennas, one or more radios, and one or more processors coupled (directly or indirectly) to the radios. At least one radio is configured to perform Wi-Fi communications. The wireless station may perform voice and/or data communications, as well as the methods described herein.

In some embodiments, one or more wireless stations operate to configure direct communication with neighboring mobile stations, i.e., direct communication between the wireless stations without utilizing an intermediate access point. Embodiments of the disclosure relate to the use of cancelable and non-cancelable further availability windows (FAWs). For example, a wireless station may remain awake for the entirety of non-cancelable FAW portions, but may not be available during part or all of cancelable FAW portions, e.g., depending on frame buffering handshakes/negotiations with peer stations of the wireless station.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
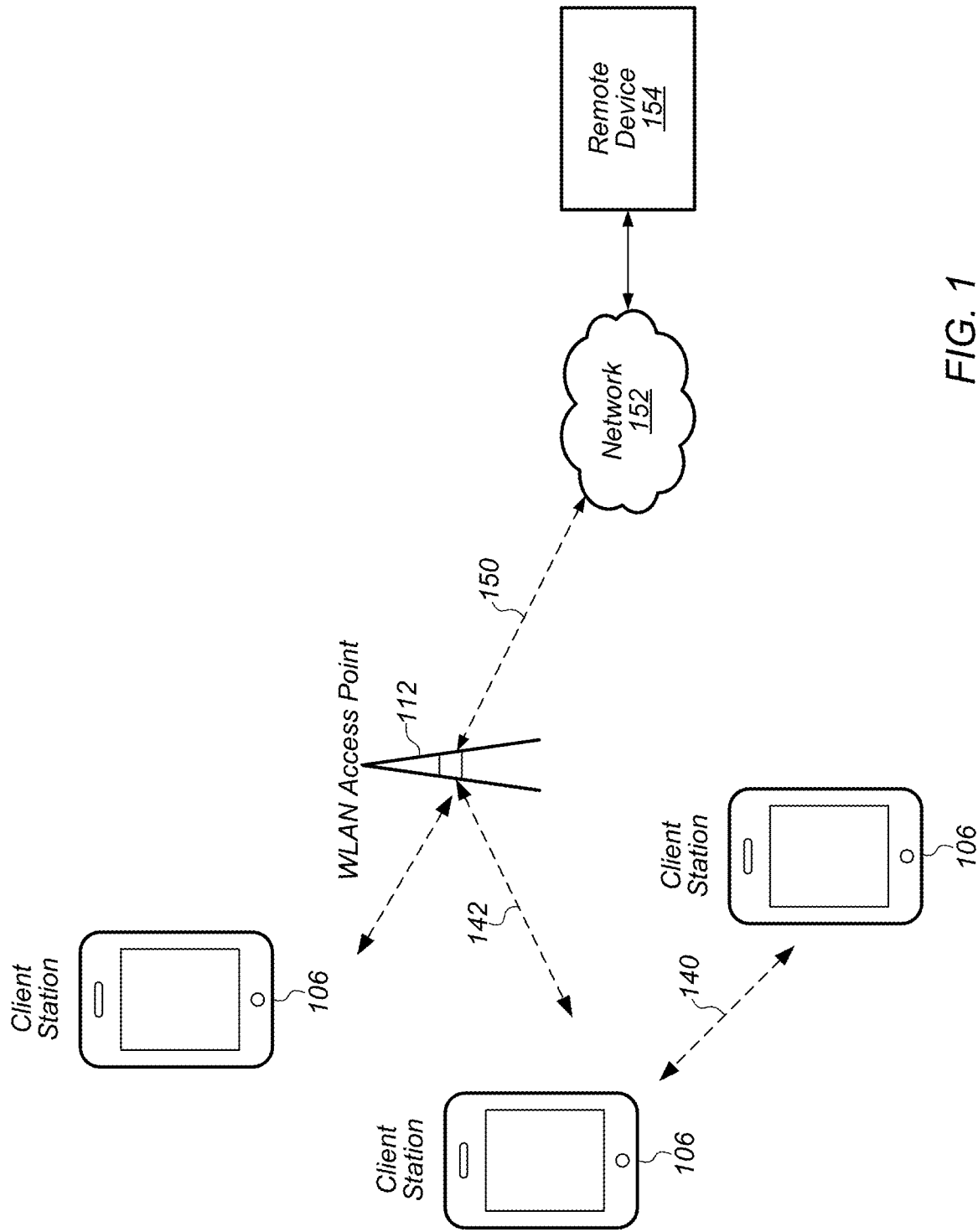
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
NAN: neighbor awareness network
NDL: NAN Data Link
NDC: NAN Data Cluster
CRB: Common Resource Block
TIM: Traffic Indication Map
RP: Rendezvous Point
WP: Wakeup Point Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™ PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

FIG. 1—WLAN System

FIG. 1 illustrates an example WLAN system according to some embodiments. As shown, the example WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly (e.g., via wireless communication channel 140) with one or more neighboring mobile devices, without use of the access point 112.

In some embodiments, as further described below, a wireless device 106 may be configured to perform methods for using cancelable and non-cancelable further availability windows in conjunction with NAN communication.

Figure 2:
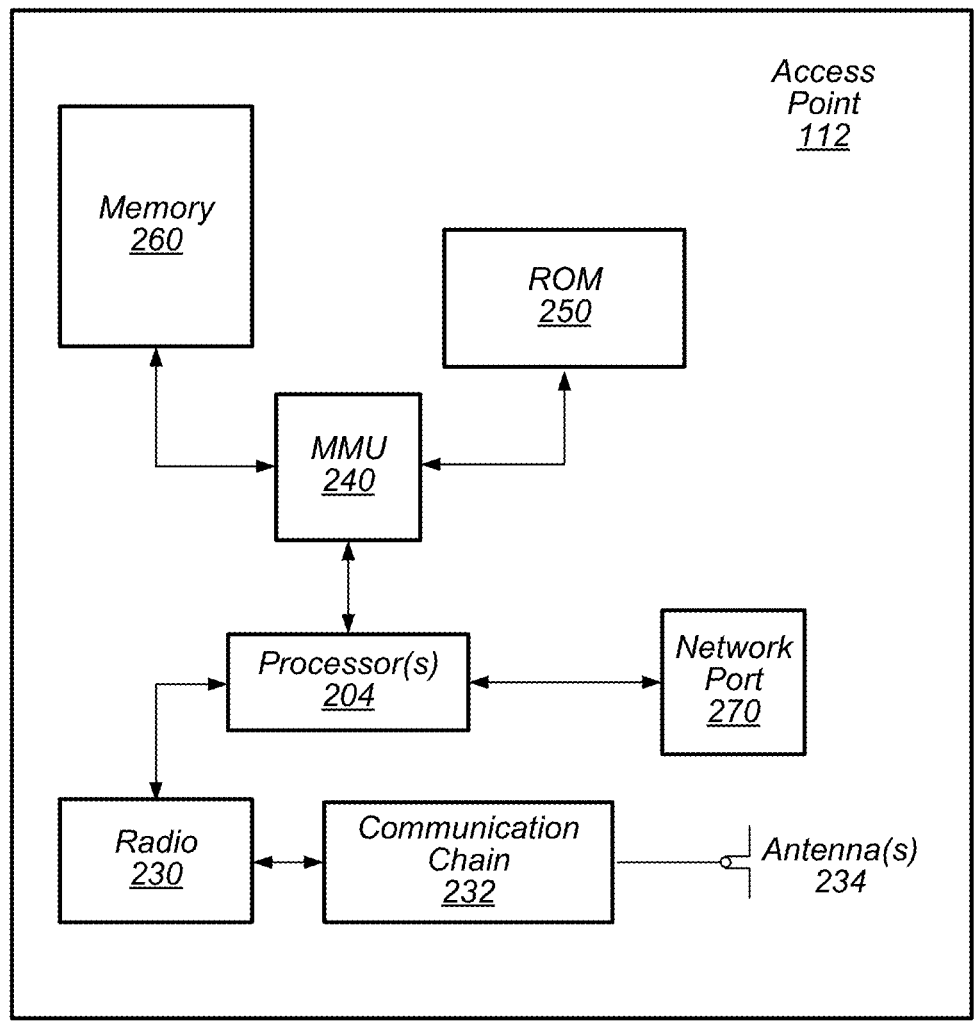
FIG. 2 illustrates an example simplified block diagram of a WLAN Access Point (AP), according to some embodiments.

FIG. 2—Access Point Block Diagram

FIG. 2 illustrates an example block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as wireless devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with wireless device 106 via wireless communication circuitry 230. The antenna(s) 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

The AP 112 may be configured to act as an access point to provide an infrastructure mode 802.11 network to wireless stations in the vicinity of the AP 112. Additionally or alternatively, the AP 112 may be configured to act as a peer station to perform peer-to-peer communications with nearby wireless stations. In some embodiments, as further described below, AP 112 may be configured to perform methods for using cancelable and non-cancelable further availability windows in conjunction with NAN communication, for example when communicating with one or more other wireless stations as a peer.

Figure 3:
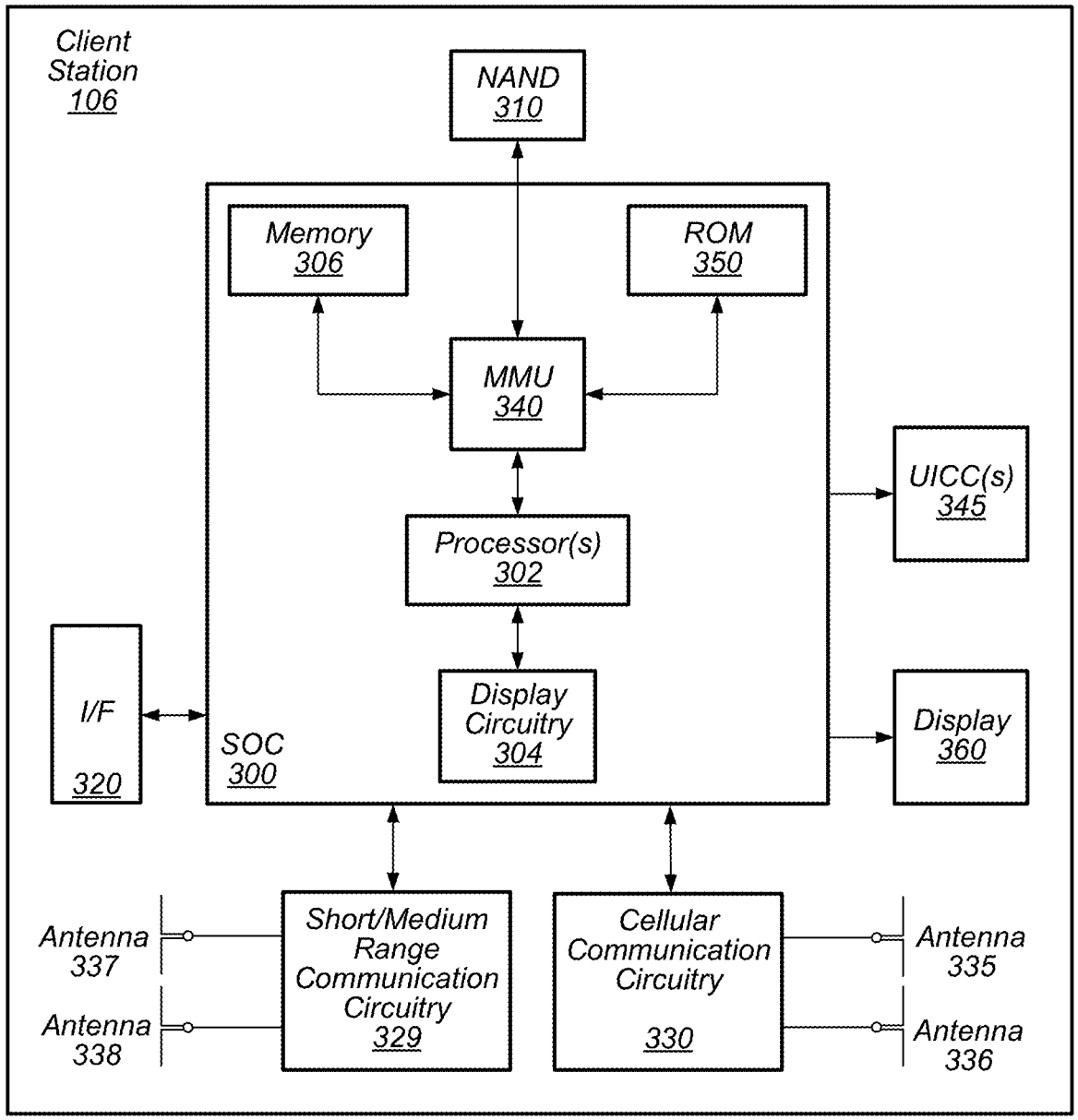
FIG. 3 illustrates an example simplified block diagram of a mobile station (UE), according to some embodiments.

FIG. 3—Client Station Block Diagram

FIG. 3 illustrates an example simplified block diagram of a client station 106. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards that incorporate SIM (Subscriber Identity Module) functionality, such as one or more UICC(s) (Universal Integrated Circuit Card(s)) 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for using cancelable and non-cancelable further availability windows in conjunction with NAN communication.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the stations that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Datapath resource allocation relates to two peer wireless stations communicating with each other regarding a common time slot and channel for communication. In other words, the two stations communicate with each other regarding which channel they should use and at which time slot, to help ensure proper communication between them. Additionally, the two stations communicate with each other regarding which channel and time slot each would prefer to use for future communications between the stations. Embodiments described herein further define methods for using cancelable and non-cancelable further availability windows in conjunction with NAN communication.

FIG. 4—Flowchart

In NAN communication systems as well as in many other peer-to-peer wireless communication systems, there may be many different types of communication that can be performed, potentially including any or all of service discovery, ranging setup, datapath setup, synchronization signaling, scheduling, and/or data frame exchanges, among various possibilities. At least according to some embodiments, peer devices in a peer-to-peer system may accordingly provide availability windows (e.g., discovery windows, further availability windows) to allow for scheduled and unscheduled communications with other peer devices in the system.

In order to ensure that sufficient resources are available for any desired communications, it may be useful to provide a conservative amount of availability, e.g., as much or more than might be expected to be used. However, if the full extent of the availability windows offered by a wireless device are not fully used, this may also lead to unnecessary power consumption, as the wireless device may remain awake during potentially substantial periods of time while no communications are being performed.

This drawback may be at least partially mitigated if at least some portion of the availability windows provided by a wireless device in a peer-to-peer communication system can be dynamically cancelled (e.g., if it can be determined that there is no further data buffered for communication to peer stations during a further availability window). Accordingly, FIG. 4 is a flowchart diagram illustrating a method for a wireless device to provide cancelable availability windows in a peer-to-peer communication system, according to some embodiments.

Figure 4:
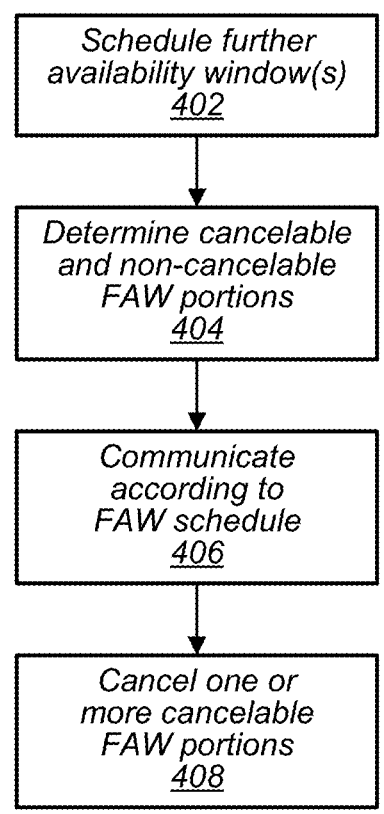
FIG. 4 is a flowchart diagram illustrating an example method for using cancelable and non-cancelable further availability windows in a NAN communication system, according to some embodiments.

Aspects of the method of FIG. 4 may be implemented by a wireless device/wireless station (such as a client station 106 and/or WLAN access point 112 illustrated in and described with respect to various of the Figures herein), or more generally in conjunction with any of the computer systems or devices shown in the above Figures, among other devices, as desired. Note that while at least some elements of the method of FIG. 4 are described in a manner relating to the use of communication techniques and/or features associated with NAN and/or Wi-Fi specification documents, such description is not intended to be limiting to the disclosure, and aspects of the method of FIG. 4 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 4 may operate as follows.

A wireless station may schedule one or more upcoming further availability windows (FAWs) with one or more peer stations (402). The FAWs may be scheduled with the peer station(s) in a NAN communication system using NAN communication. The FAWs may be scheduled using NDL scheduling negotiations between the wireless station and (each of) the peer station(s), e.g., each including a NDL schedule proposal message, a NDL schedule counter proposal message, and a NDL schedule confirm proposal message, as one possibility.

The wireless station may determine which portions of the FAWs are cancelable and which portions are non-cancelable (404). The determination may be performed dynamically, e.g., based on the specific communication needs/desires of the wireless station and its peer stations at the time, or may be based on a predetermined configuration (e.g., specified in a wireless communication standard according to which the wireless station and its peer stations communicate).

In scenarios in which the cancelable and non-cancelable portions of the FAWs are dynamically determined, the wireless station may provide an indication to (at least some of) its peer devices of which FAW portions are cancelable and/or which FAW portions are non-cancelable. The indication(s) may be provided using broadcast, multicast, and/or unicast communication, according to various embodiments.

For example, as one possibility, the wireless station may announce its FAW schedule, including providing a broadcast indication of its committed FAWs and a non-cancelable schedule time bitmap that indicates those time slots among the committed FAWs that will not be canceled. In this example, the remaining time slots may be considered to be cancelable. Alternatively, a bitmap indicating those time slots among the committed FAWs that are cancelable (with the implication that the remaining time slots are non-cancelable) or a bitmap providing indications both of which time slots are non-cancelable and of which time slots are cancelable may be provided, if desired.

As another possibility, the wireless station may use a combination of broadcast announcement frames, multicast announcement frames, and unicast announcement/negotiation frames. For example, the wireless station may broadcast an indication just of the non-cancelable FAWs. The wireless station may also multicast an indication of some or all of the cancelable FAWs (possibly in addition to an indication of the non-cancelable FAWs) to a multicast group of peers, such that those peers in the multicast group can use (e.g., transmit/receive multicast frames to/from the wireless station during) the indicated cancelable FAWs. Additionally or alternatively, the wireless station may unicast an indication of some or all of the cancelable FAWs (possibly in addition to an indication of the non-cancelable FAWs) to each of one or more individual peers devices, such that different cancelable FAWs can be negotiated/updated with different peers, and some of the cancelable FAWs of the wireless station may be "hidden" from other neighboring devices.

Note that in scenarios in which the cancelable and non-cancelable portions of the FAWs can be determined based on configuration information specified in a communication standard used by the wireless station and its peer stations, the wireless device may not provide an explicit indication of which portions of the scheduled FAWs are cancelable or which portions of the scheduled FAWs are non-cancelable, e.g., since the peer stations may be able to independently determine the cancelable/non-cancelable configuration of the scheduled FAWs.

Note also that any of various predetermined configuration rules may be used to specify which FAW portions are cancelable and which are non-cancelable in such a scenario. As one possibility, for each respective FAW, a certain portion (e.g., a beginning portion) may be considered non-cancelable, and the remainder (e.g., a subsequent portion) may be considered cancelable. The portion specified as non-cancelable may be a certain percentage (e.g., 5%, 10%, 15%, etc.) of the total length of the FAW, or may be a certain fixed length of time of each FAW, or may be selected in any other desired manner.

The wireless station may communicate according to the FAW schedule (406). This may include transmitting and/or receiving frames for further service discovery, ranging setup, datapath and/or further scheduling setup, e.g., with peer devices with which a NDL may not already be established. Since such operations may be unscheduled, it may be the case that communications for these operations may occur (e.g., primarily) during non-cancelable FAW portions, e.g., as the wireless station may reliably remain awake for such portions. Such operations may also occur (or be attempted) during cancelable FAW portions in some instances, though it may be possible in such instances for a peer station to attempt one of these operations with the wireless station after the wireless station has canceled a FAW portion, entered a reduced power state, and is not monitoring the communication medium. Communication according to the FAW schedule may also or alternatively include transmitting and/or receiving data frames, e.g., with peer devices with which a NDL has been established. Such operations may occur during either non-cancelable or cancelable FAW portions. During cancelable FAW portions, the wireless station may negotiate directly with its NDL peer devices with shared FAW portions to determine if/when part or all of a scheduled FAW portion can be canceled, e.g., using frame buffering handshakes.

The wireless station may cancel one or more cancelable FAW portions of the scheduled FAWs (408). As noted, the wireless station may first negotiate with any active NDL peers to confirm that the wireless station and each such NDL peer do not have any further frames buffered and ready to be transmitted to each other. For example, upon determining that the wireless station does not have any further data frames buffered for a peer wireless station and that a certain amount of time has passed since any data frames have been received from the peer wireless station during a cancelable FAW, the wireless station may transmit an indication to the peer wireless station to buffer any further data frames for the wireless station at least for the remainder of the FAW (e.g., until their next rendezvous point). The peer wireless station may respond to the wireless station with an acknowledgement (e.g., to confirm that it will buffer any further data frames for the wireless station and indicate in turn that the wireless station should also buffer any further data frames for the peer wireless station). Note that such a frame buffering handshake may be initiated by either the wireless station or its peer wireless station, in various circumstances. Based on such an exchange (and potentially other similar exchanges with any other active NDL peers of the wireless station), the wireless station may be able to determine that there are no NDL peers with which the wireless station is actively communicating, and that the remainder of the cancelable FAW can be canceled without impacting any communication with any peer devices.

Once it is determined that the wireless station can cancel a FAW portion, the wireless station may enter a reduced power state, e.g., by reducing the power provided to some or all components of the wireless station, for the remainder of the FAW. While in this reduced power (or "sleeping") state, the wireless station may not monitor the wireless communication medium used to communicate with its peer devices (e.g., as the components that would normally be used for such operations may be at reduced power levels). Eventually (e.g., at a next rendezvous point or other determined wakeup interval), the wireless station may resume normal ("waking" or "awake") operation, e.g., fully powering its components, monitoring the wireless medium, and potentially transmitting and/or receiving data and/or signaling frames further in accordance with its FAW schedule.

Thus, by providing the possibility of canceling at least some portion of the availability windows scheduled by a wireless station in a peer-to-peer communication system, it may be possible to provide more availability windows and thus a more flexible availability schedule while minimizing potentially unnecessary power consumption from remaining awake during availability window portions when there is no data to be exchanged, since it may be possible to cancel such unneeded availability window portions.

FIGS. 5-11—Cancelable NAN Schedule Indication

FIGS. 5-11 and the following information are provided as being illustrative of further considerations and possible implementation details relating to the method of FIG. 4, and are not intended to be limiting to the disclosure as a whole. Numerous variations and alternatives to the details provided herein below are possible and should be considered within the scope of the disclosure.

Figure 5:
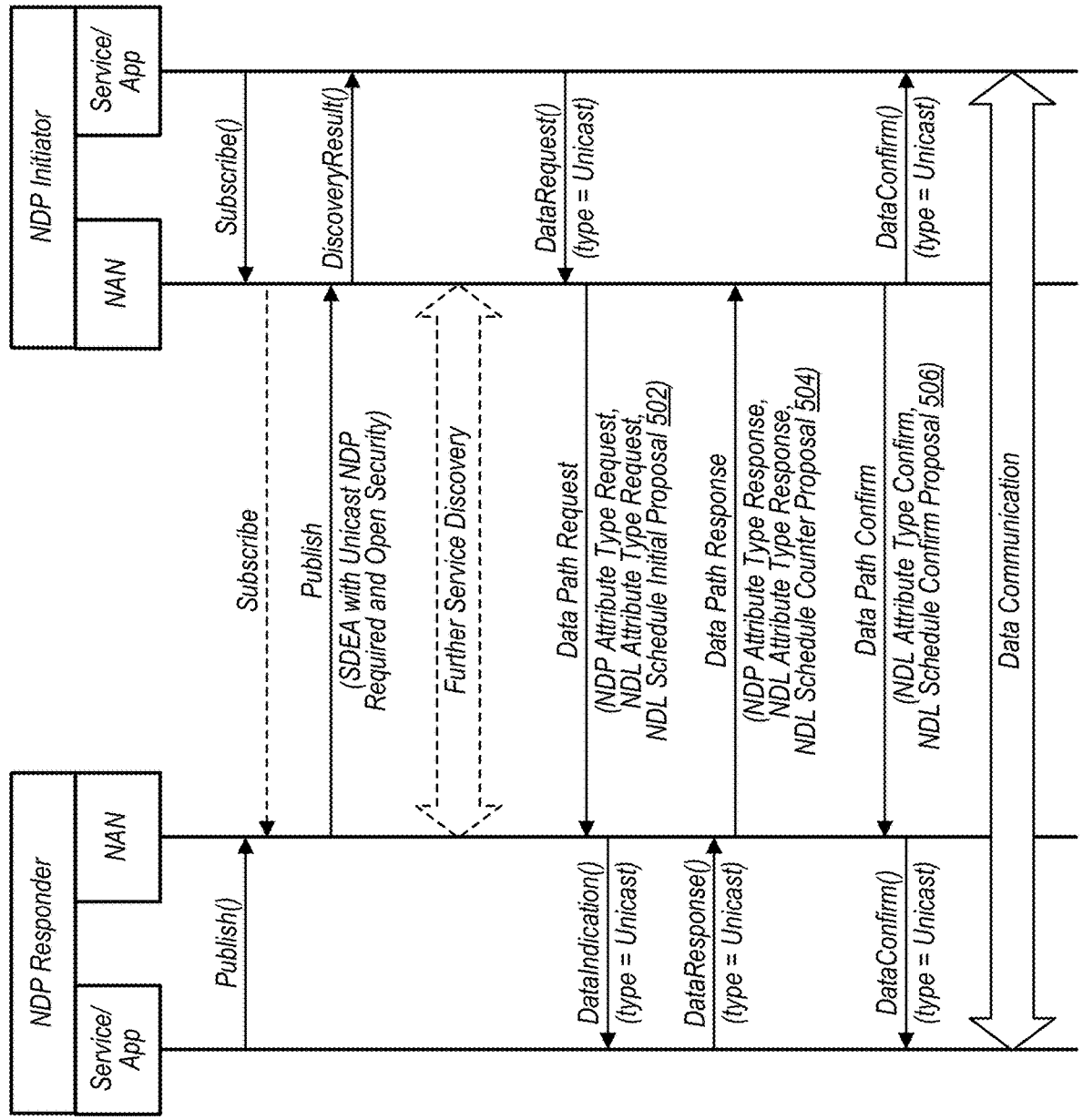
FIG. 5 illustrates an example signaling exchange negotiating FAW scheduling between two wireless stations, according to some embodiments.
Figure 6:
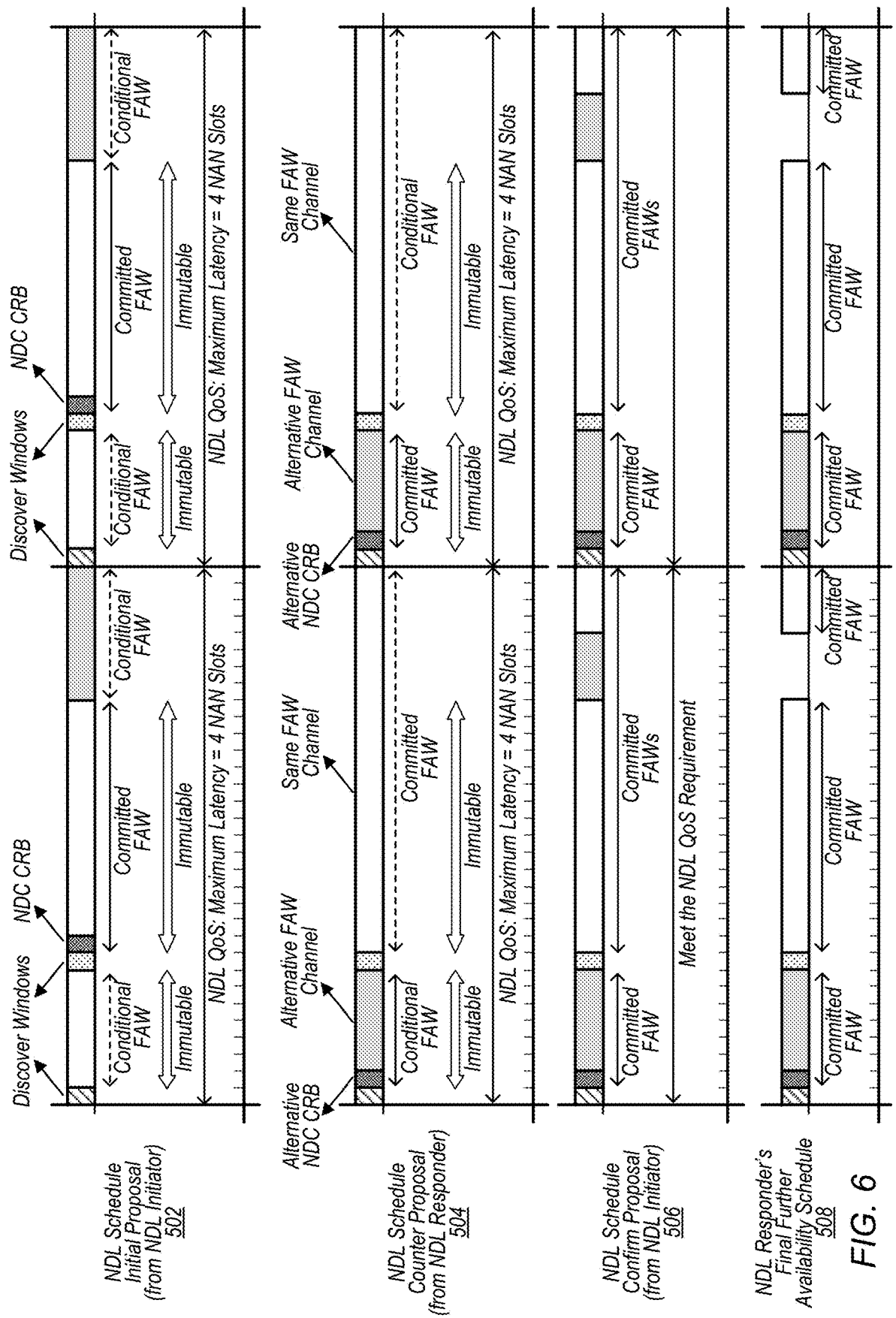
FIG. 6 illustrates further details of the example signaling exchange of FIG. 5, according to some embodiments.

FIGS. 5-6 illustrate an example further availability window (FAW) scheduling negotiation between two wireless stations, according to some embodiments. As shown in FIG. 5, the negotiation may include a NDL schedule initial proposal 502 presented by one of the wireless stations (the NDP initiator), a NDL schedule counter proposal 504 presented by the other of the wireless stations (the NDP responder), and a NDL schedule confirm proposal 506 again presented by the NDP initiator.

As shown in FIG. 6, in the NDL schedule initial proposal 502, the NDP initiator may indicate periods of time that are "committed" FAWs for the NDP initiator (e.g., for which the NDP initiator has already committed to being available), and may indicate periods of time that are "conditional" FAWs for the NDP initiator (e.g., for which the NDP initiator has not yet committed to being available, but that the NDP initiator could be available if so desired by the NDP responder). A channel on which each of the committed and/or conditional FAWs will/could occur may also be indicated.

As further shown in FIG. 6, in the NDL schedule counter proposal 504, the NDP responder may indicate periods of time that are committed FAWs for the NDP responder (e.g., for which the NDP responder has already committed to being available), and may indicate periods of time that are conditional FAWs for the NDP responder (e.g., for which the NDP responder has not yet committed to being available, but that the NDP responder could be available if so desired by the NDP initiator). A channel on which each of the committed and/or conditional FAWs will/could occur may also be indicated.

As still further shown in FIG. 6, in the NDL schedule confirm proposal 506, the NDP initiator may indicate periods of time that are selected as committed FAWs for the NDP initiator, e.g., based on the NDL schedule initial proposal 502 and the NDL schedule counter proposal 504. A channel on which each of the committed FAWs will occur may also be indicated. The NDP responder may also finalize its further availability schedule based on the NDL schedule confirm proposal 506, e.g., as shown in FIG. 6 as the NDL responder's final further availability schedule 508. As a result of such negotiation, certain time blocks in common between the NDP intiator's committed FAWs and NDP responder's committed FAWs may be scheduled. Such time blocks may also be referred to as common resource blocks (CRBs) between those wireless stations.

Figure 7:
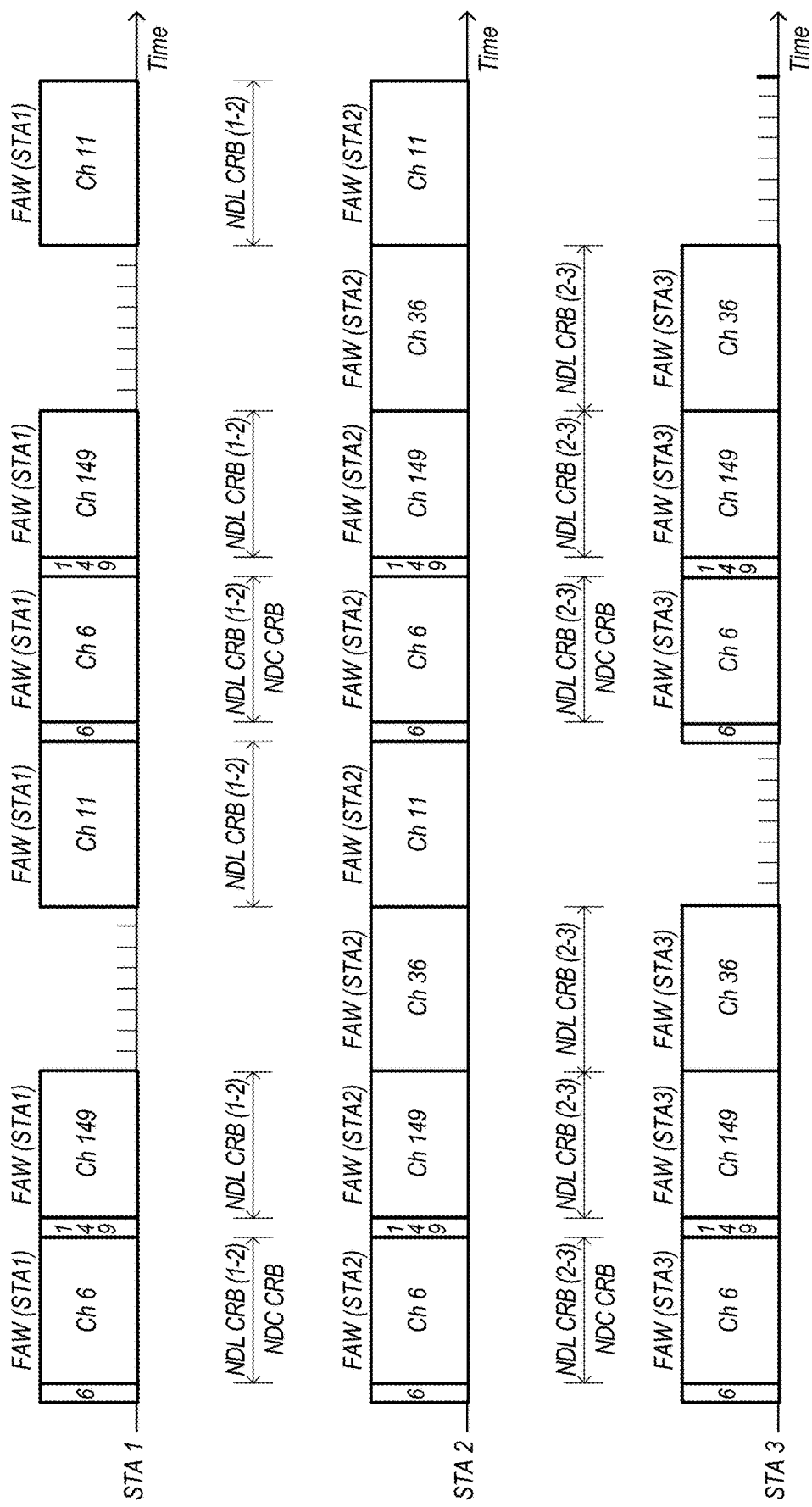
FIG. 7 illustrates an example of a possible NAN communication schedule among several wireless stations, according to some embodiments.

FIG. 7 illustrates an example of a possible NAN communication schedule among several wireless stations (STA 1, STA 2, STA 3). For example, the illustrated communication schedule may come about based at least in part on negotiations between STAs 1-3 such as illustrated in and described with respect to FIGS. 5-6.

As shown, various time blocks may be indicated as FAWs on certain channels by each wireless station. The overlapped portions of FAWs between multiple stations may serve as CRBs for those wireless stations. As shown, some time blocks may function as a CRB for all wireless stations in a NAN data cluster (NDC), while some time blocks may function as a CRB between wireless station pairs.

Figure 8:
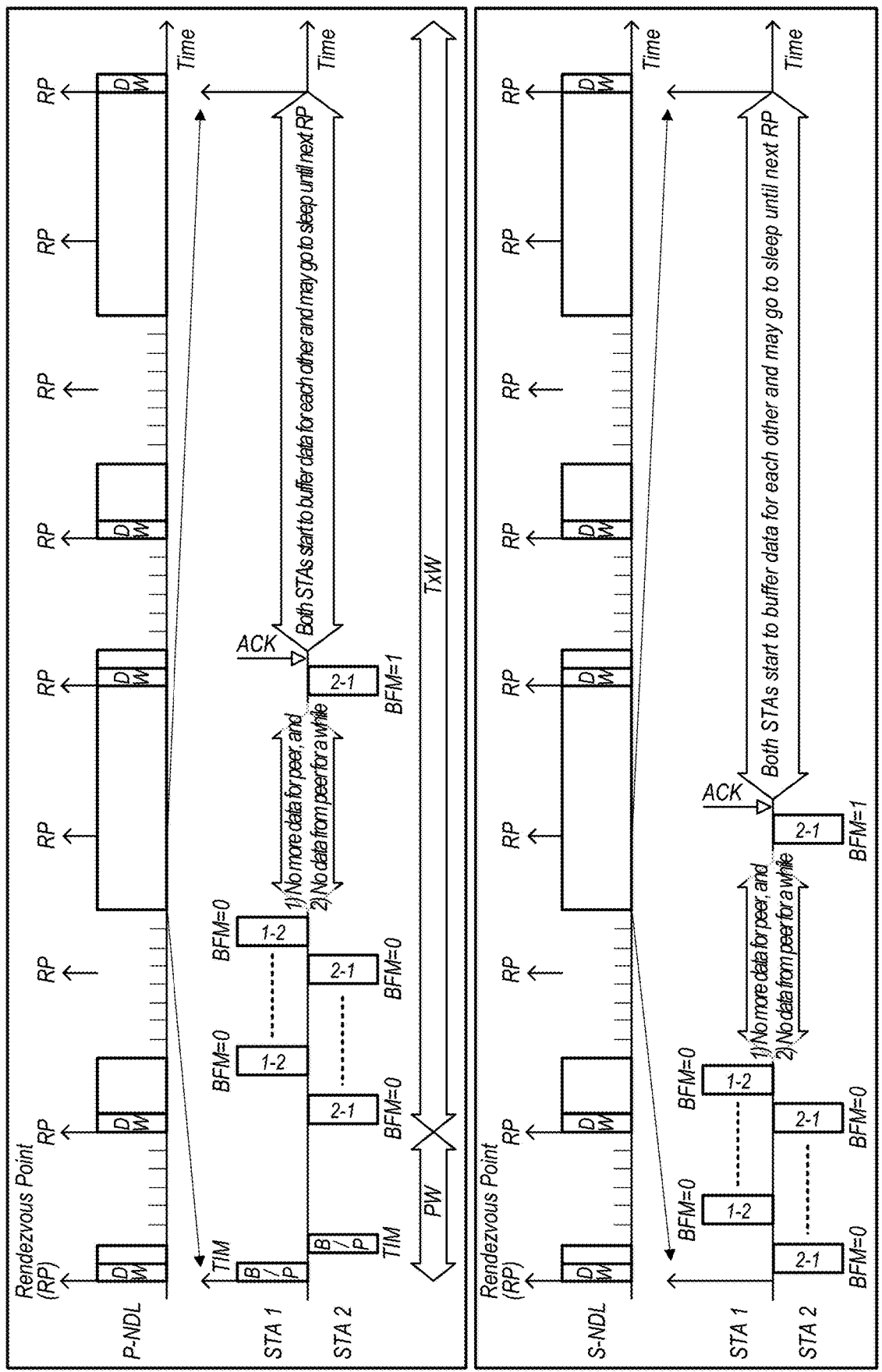
FIG. 8 illustrates examples of possible P-NDL and S-NDL communication between two STAs, according to some embodiments.

FIG. 8 illustrates examples of possible P-NDL and S-NDL communication between two STAs (STA 1, STA 2), in which both STAs have some data buffered for the other STA at the beginning of a CRB. As shown, the STAs may exchange data frames (after a paging window in the case of the P-NDL communication) with a "buffer for me" (BFM) flag set to 0 for a certain amount of time, eventually emptying their buffers for each other. After a predetermined period of time in which there is no further data received from the peer and no further data for the peer, one of the STAs (e.g., STA 2 as illustrated) may transmit a frame with BFM=1, which the other STA may successfully receive and acknowledge. Based on providing and receiving this indication, both STAs may start to buffer data for each other and may go to sleep (e.g., provided there are no other current activities, such as communication with another STA, in progress for the STA) until the next rendezvous point (RP) between the STAs.

When a station announces its committed FAWs, it may be the case that all neighboring stations may make use of the station's committed FAWs for various purposes, for example including further service discovery, ranging setup, datapath and schedule setup, and data frame exchanges. For operations such as further service discovery, ranging setup, and/or datapath and schedule setup, it may be the case that an unknown neighbor may transmit frames to the station at any point within any announced committed FAW. Accordingly, with such an arrangement, whenever the station announces a committed FAW for any of these operations, it may have to stay awake for the whole FAW. For data frame exchanges, the station may need to negotiate with each NDL peer for sufficient CRBs to support potential data traffic. Since data traffic and channel conditions may be unpredictable (at least in some instances), it may be the case that such CRBs are over-reserved. Accordingly, an arrangement in which at least some CRBs (or portions of such CRBs) may be cancelable, while other CRBs (or CRB portions) remain non-cancelable, may be beneficial to one or more stations.

For example, for non-cancelable FAW portions, a station may remain awake for the entire portions. Accordingly, any other station may transmit to the station at any time during these portions (e.g., following medium access and/or NAN rules), without worrying that the station may become unavailable. Such portions may serve those peer stations wishing to perform service discovery, ranging setup, and/or datapath and schedule setup with the station, for example.

For the cancelable FAW portions, the station may not be available during part or all of the portions. The station's active NDL peers may be able to determine whether the station is available or may be unavailable, e.g., based on their frame buffering handshakes. Such portions may serve those peer stations wishing to perform data frame exchanges with the station, for example.

Figure 9:
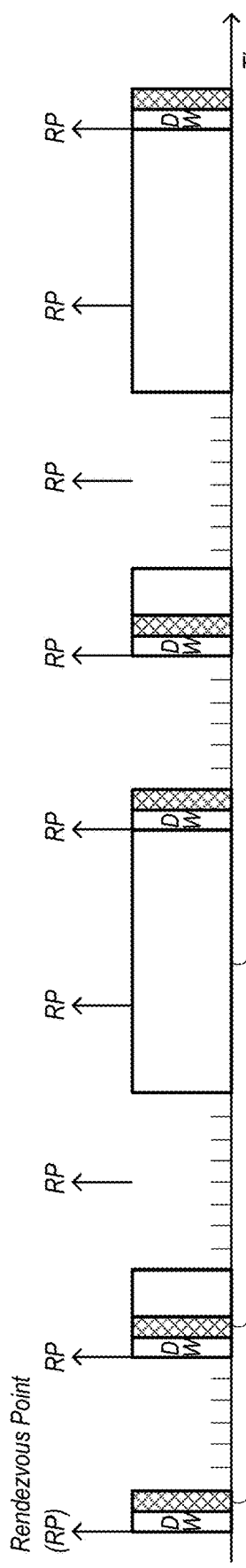
FIGS. 9-11 illustrate examples of various possible approaches for indicating cancelable and non-cancelable FAWs, according to some embodiments.

There are multiple possible approaches to indicate cancelable and non-cancelable FAW portions, at least according to some embodiments. As one possible approach, a station may, when it announces its FAW schedule, include a NAN availability attribute, which indicates its committed FAWs. An example timeline in which such an approach is utilized is illustrated in FIG. 9. The FAW schedule may further include a non-cancelable schedule time bitmap, which may indicate which time slots among the committed FAWs cannot be canceled. In other words, the FAW schedule may indicate those times during which the station shall always be present, according to some embodiments. The remaining time slots of the committed FAWs may be considered to be cancelable. Alternatively, a station could indicate that certain portions of the FAW schedule are cancelable, implicitly indicating that the remaining portions of the FAWs are non-cancelable, or could explicitly indicate both those FAW portions that are non-cancelable and those FAW portions that are cancelable. This approach may be implemented by any mechanism; as one example, a station may be able to use broadcast frames to announce both cancelable and non-cancelable FAW portions to all stations.

Figure 10:
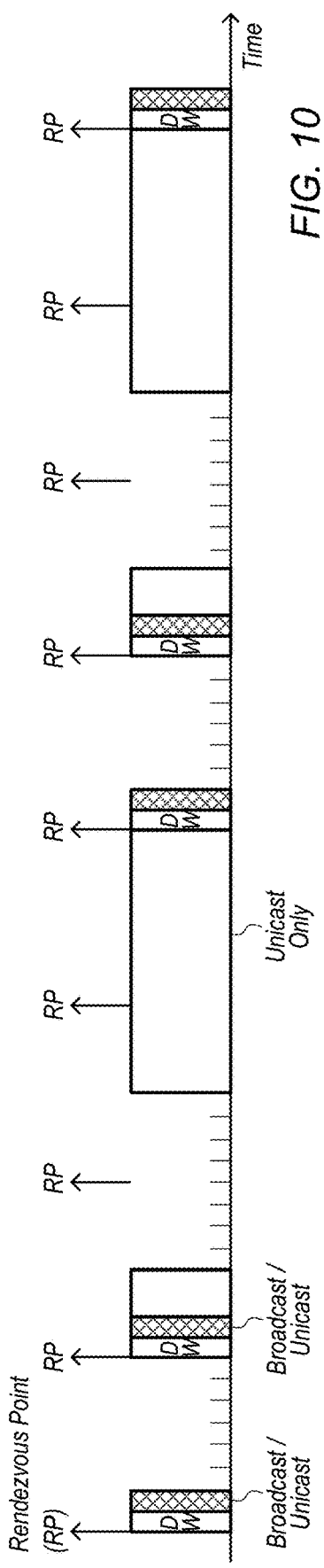

As another possible approach, a station may include different FAW schedules in broadcast announcement frames, multicast announcement frames, and unicast announcement/negotiation frames. An example timeline in which such an approach is utilized is illustrated in FIG. 10. For example, the broadcast frames may include only the non-cancelable FAWs. All stations that receive the broadcast announcement may be able to make use of the non-cancelable FAWs to transmit frames to the station. The multicast frames may include the non-cancelable and/or cancelable FAWs. All stations that receive the multicast frames may also be able to make use of the non-cancelable FAWs to transmit frames to the station. In addition, the station may be able to use the cancelable FAWs to transmit multicast data frames to the multicast peers, and may abort the FAWs when it completes transmission of all buffered frames. The unicast frames may include both the non-cancelable and the cancelable FAWs. The station may use unicast frames to negotiate and update its cancelable FAWs with individual NDL peers, which may be "hidden" from other neighboring stations. Thus, the station may be able negotiate and update different cancelable FAWs with different NDL peers. This approach may be slightly more complex to implement, but may provide additional flexibility with respect to the signaling and use of cancelable FAW portions.

Figure 11:
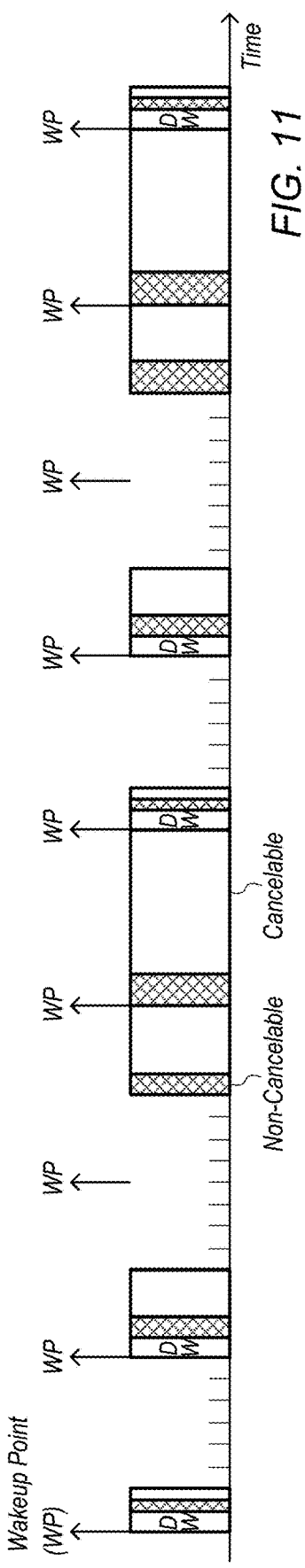

As still another possible approach, a station may indicate that the beginning portion of some (or all) FAWs is non-cancelable, while the remaining portion is cancelable. An example timeline in which such an approach is utilized is illustrated in FIG. 11. In such a case, the station may specify a series of wakeup points (WPs), which may be aligned with its rendezvous points (RPs), e.g., using a period, such as the smallest RP period between the station and any peer station with which the station has arranged RPs. The station may be awake at the FAW immediately following a WP, and may remain awake for at least a certain portion (e.g., 5%, 10%, 15%, or any other desired portion, possibly with a minimum time value) of the FAW duration. According to some embodiments, this portion of time may correspond to the length of the paging window when performing P-NDL communication. This portion of the FAW may be considered to be non-cancelable, while the remaining portion of the FAW may be considered to be cancelable. If one or more WPs fall into a FAW, the WPs may effectively divide the FAW into multiple new/shorter FAWs, e.g., with the beginning portion of each new FAW considered to be non-cancelable. Note that if there are multiple FAWs between two adjacent WPs, it may be the case that only the first FAW immediately following the previous WP has a non-cancelable portion; all other FAWs prior to the next WP may not have any non-cancelable portion. This approach may reduce the amount of signaling used to indicate cancelable and non-cancelable portions, at least according to some embodiments; for example, if the beginning portion of the FAW that is non-cancelable is defined by standard specification documents or otherwise pre-agreed upon by stations in the communication system, it may not be necessary to provide any signaling explicitly indicating which portions of an FAW schedule correspond to cancelable and non-cancelable FAW portions. However, in such a case, there may be reduced flexibility with respect to choosing which FAWs or FAW portions are cancelable and which are non-cancelable.

In the following further exemplary embodiments are provided.

One set of embodiments may include a wireless station, comprising: at least one antenna; at least one wireless interface communicatively coupled to the at least one antenna; and at least one processor communicatively coupled to the at least one wireless interface; wherein the wireless station is configured to: schedule one or more upcoming further availability windows (FAWs) for the wireless station for neighbor awareness network (NAN) communication, wherein a first portion of the upcoming FAWs comprise non-cancelable FAW portions, wherein a second portion of the upcoming FAWs comprise cancelable FAW portions.

According to some embodiments, the wireless station is further configured to: broadcast an indication of one or more non-cancelable FAW portions of the upcoming FAWs.

According to some embodiments, the wireless station is further configured to: multicast an indication of one or more cancelable FAW portions of the upcoming FAWs to one or more peer stations in a multicast group.

According to some embodiments, the wireless station is further configured to: unicast an indication of one or more cancelable FAW portions of the upcoming FAWs to a peer station.

According to some embodiments, for each respective FAW of the one or more upcoming FAWs, a specified portion of the respective FAW at a beginning of the FAW comprises a non-cancelable portion of the respective FAW, and a remainder of the respective FAW comprises a cancelable portion of the respective FAW.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a wireless device to:
schedule one or more upcoming further availability windows (FAWs) for the wireless device, wherein the one or more upcoming FAWs are useable for neighbor awareness network (NAN) communication with a second wireless device;
transmit, to the second wireless device, a bitmap distinguishing at least one time slot of a FAW of the one or more upcoming FAWs that is cancelable from at least one time slot of the FAW of the one or more upcoming FAWs that is non-cancelable; and cancel a first portion of the at least one time slot of the FAW of the one or more upcoming FAWs that is cancelable, wherein a second portion of the at least one time slot of the FAW of the one or more upcoming FAWs that is cancelable is not cancelled.

2. The apparatus of claim 1, wherein to cancel the first portion of the at least one time slot of the FAW of the one or more upcoming FAWs that is cancelable, the processing element is further configured to cause the wireless device to:
perform a frame buffering handshake with a peer device, wherein the frame buffering handshake comprises an indication that the wireless device will buffer frames for the peer device for a remainder of the FAW of the one or more upcoming FAWs and that the peer device will buffer frames for the wireless device for the remainder of the FAW of the one or more upcoming FAWs.

3. The apparatus of claim 1,
wherein the processing element is further configured to cause the wireless device to remain awake for the at least one time slot of the FAW of the one or more upcoming FAWs that is non-cancelable.

4. The apparatus of claim 3, wherein the processing element is further configured to cause the wireless device to:
broadcast an indication that the at least one time slot of the FAW of the one or more upcoming FAWs that is non-cancelable comprise non-cancelable FAW portions.

5. The apparatus of claim 3, wherein transmitting the bitmap distinguishing at least one time slot of the FAW of the one or more upcoming FAWs that is cancelable from at least one time slot of the FAW of the one or more upcoming FAWs that is non-cancelable comprises broadcasting, multicasting, or unicasting the bitmap.

6. The apparatus of claim 3,
wherein for each respective FAW of the one or more upcoming FAWs, a predetermined portion of the respective FAW comprises a non-cancelable portion of the respective FAW and a remainder of the respective FAW comprises a cancelable portion of the respective FAW.

7. A wireless station, comprising:
at least one antenna;
at least one wireless interface communicatively coupled to the at least one antenna; and
at least one processor communicatively coupled to the at least one wireless interface;
wherein the wireless station is configured to:
schedule one or more upcoming further availability windows (FAWs) for the wireless station, wherein the one or more upcoming FAWs are useable for neighbor awareness network (NAN) communication with a second wireless station;
transmit, to the second wireless station, a bitmap distinguishing at least one time slot of a FAW of the one or more upcoming FAWs that is cancelable from at least one time slot of the FAW of the one or more upcoming FAWs that is non-cancelable; and
cancel a first portion of the at least one time slot of the FAW of the one or more upcoming FAWs that is cancelable, wherein a second portion of the at least one time slot of the FAW of the one or more upcoming FAWs that is cancelable is not cancelled.

8. The wireless station of claim 7, wherein the wireless station is further configured to:
broadcast an indication that the at least one time slot of the FAW of the one or more upcoming FAWs that is non-cancelable comprise non-cancelable FAW portions.

9. The wireless station of claim 7, wherein transmitting the bitmap distinguishing at least one time slot of a FAW of the one or more upcoming FAWs that is cancelable from at least one time slot of the FAW of the one or more upcoming FAWs that is non-cancelable comprises multicasting an indication of the at least one time slot of the FAW of the one or more upcoming FAWs that is cancelable to one or more peer stations in a multicast group.

10. The wireless station of claim 7, wherein transmitting the bitmap distinguishing at least one time slot of the FAW of the one or more upcoming FAWs that is cancelable from at least one time slot of the FAW of the one or more upcoming FAWs that is non-cancelable comprises unicasting an indication of the at least one time slot of the FAW of the one or more upcoming FAWs that is cancelable to a peer station.

11. The wireless station of claim 7,
wherein for each respective FAW of the one or more upcoming FAWs, a specified portion of the respective FAW at a beginning of the FAW comprises a non-cancelable portion of the respective FAW, and a remainder of the respective FAW comprises a cancelable portion of the respective FAW.

12. The wireless station of claim 7,
wherein the wireless station is configured to remain awake for a full duration of non-cancelable FAW portions,
wherein the wireless station is configured to go to sleep for any cancelable FAW portions for which the wireless station has exchanged a frame buffering handshake with any active neighbor data link (NDL) peers.

13. A method, comprising:
by a wireless device:
negotiating a further availability window (FAW) schedule, wherein the FAW schedule is useable for upcoming neighbor awareness network (NAN) communication with one or more peer wireless devices;
determining which portions of the FAW schedule comprise non-cancelable portions and which portions of the FAW schedule comprise cancelable portions;
transmitting, to at least one of the one or more peer wireless devices, a bitmap distinguishing at least one time slot of a FAW of the FAW schedule that is cancelable from at least one time slot of the FAW of the FAW schedule that is non-cancelable; and
communicating with the one or more peer wireless devices according to the FAW schedule, wherein communicating with the one or more peer devices according to the FAW schedule comprises cancelling a first portion of the at least one time slot of the FAW of the FAW schedule that is cancelable and not cancelling a second portion of the at least one time slot of the FAW of the one or more upcoming FAWs that is cancelable.

14. The method of claim 13, further comprising:
providing an indication that one or more portions of the FAW schedule comprise non-cancelable portions.

15. The method of claim 14,
wherein the indication that one or more portions of the FAW schedule comprise non-cancelable portions is provided as a broadcast indication.

16. The method of claim 13,
wherein the bitmap distinguishing at least one time slot of the FAW of the one or more upcoming FAWs that is cancelable from at least one time slot of the FAW of the one or more upcoming FAWs that is non-cancelable is transmitted as a multicast indication.

17. The method of claim 13,
wherein the bitmap distinguishing at least one time slot of the FAW of the one or more upcoming FAWs that is cancelable from at least one time slot of the FAW of the one or more upcoming FAWs that is non-cancelable is transmitted as a unicast indication.

18. The method of claim 13,
wherein for each respective FAW of the FAW schedule, an initial portion of the respective FAW comprises a non-cancelable portion of the respective FAW and a subsequent portion of the respective FAW comprises a cancelable portion of the respective FAW.

19. The method of claim 13, wherein canceling the first portion of the at least one time slot of the FAW of the FAW schedule that is cancelable comprises:
performing a frame buffering handshake with each of the one or more peer wireless devices to confirm that the wireless device will buffer frames for each of the one or more peer wireless devices for a remainder of the FAW of the FAW schedule and that each of the one or more peer wireless devices will buffer frames for the wireless device for the remainder of the FAW of the FAW schedule.

20. The method of claim 19,
wherein canceling the first portion of the at least one time slot of the FAW of the FAW schedule that is cancelable further comprises:
entering a reduced power state for the remainder of the FAW of the FAW schedule.

\* \* \* \* \*